(12) United States Patent
Thai et al.

(10) Patent No.: US 11,140,555 B2
(45) Date of Patent: Oct. 5, 2021

(54) LOCATION-BASED IDENTIFICATION OF POTENTIAL SECURITY THREAT

(71) Applicant: Cisco Technology, Inc., San Jose, CA (US)

(72) Inventors: Hien Thi Thai, Elk Grove, CA (US); Andrew Fu-Chung Teng, San Diego, CA (US); Pramod Nair, Dublin (IE); Hidde Beumer, Veenendaal (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/444,237

(22) Filed: Jun. 18, 2019

(65) Prior Publication Data
US 2020/0404490 A1  Dec. 24, 2020

(51) Int. Cl.
  *H04W 12/71* (2021.01)
  *H04W 12/61* (2021.01)
  *H04L 29/06* (2006.01)
  *H04W 12/12* (2021.01)

(52) U.S. Cl.
  CPC ............ *H04W 12/71* (2021.01); *H04L 63/02* (2013.01); *H04W 12/12* (2013.01); *H04W 12/61* (2021.01)

(58) Field of Classification Search
  CPC ..... H04W 12/00512; H04W 12/00502; H04W 12/12; H04W 12/005; H04W 12/1202; H04L 63/126
  See application file for complete search history.

(56) References Cited

U.S. PATENT DOCUMENTS

| | | |
|---|---|---|
| 8,387,141 B1 | 2/2013 | Zhukov et al. |
| 8,472,384 B2 | 6/2013 | Shu et al. |
| 9,019,937 B2 | 4/2015 | Kalmbach et al. |
| 9,038,151 B1 * | 5/2015 | Chua ............... H04L 63/02 726/6 |
| 9,992,625 B2 | 6/2018 | Dhammawat et al. |
| 10,034,232 B2 | 7/2018 | Tagg et al. |
| 10,084,680 B2 | 9/2018 | Dolson et al. |

(Continued)

OTHER PUBLICATIONS

T. Ramakrishnaiah et al., "Geolocalization Techniques using Log Files in Android", International Journal of Computer Applications (0975-8887), vol. 80—No. 17, Oct. 2013, 6 pages.

(Continued)

*Primary Examiner* — Robert B Leung
(74) *Attorney, Agent, or Firm* — Edell, Shapiro & Finnan, LLC

(57) ABSTRACT

In one example, a firewall obtains a first network packet that indicates a first mobile country code of a mobile subscriber at a first time and a first mobile network code of the mobile subscriber at the first time. The firewall obtains a second network packet that indicates a second mobile country code of the mobile subscriber at a second time and a second mobile network code of the mobile subscriber at the second time. The firewall determines whether the first mobile country code is different from the second mobile country code or the first mobile network code is different from the second mobile network code. If so, the firewall determines whether a difference between the second time and the first time is less than a threshold difference. If so, the firewall associates the second network packet with a potential security threat.

20 Claims, 14 Drawing Sheets

(56) References Cited

U.S. PATENT DOCUMENTS

| | | | |
|---|---|---|---|
| 2003/0081607 A1* | 5/2003 | Kavanagh | H04L 63/0227 370/392 |
| 2008/0228721 A1* | 9/2008 | Wahl | G06F 21/316 |
| 2011/0124317 A1* | 5/2011 | Joo | H04W 4/029 455/411 |
| 2013/0110715 A1* | 5/2013 | Buchhop | G06Q 40/02 705/42 |
| 2016/0210633 A1* | 7/2016 | Epelman | G06Q 20/4016 |
| 2017/0155652 A1* | 6/2017 | Most | H04L 63/08 |
| 2018/0167906 A1 | 6/2018 | Chellamani et al. | |
| 2018/0375900 A1 | 12/2018 | Verma et al. | |
| 2020/0053044 A1* | 2/2020 | Mahalank | H04L 63/0876 |

OTHER PUBLICATIONS

Juniper Networks, Inc., "GTP Subscriber Trace Configuration", https://www.juniper.net/help/english/6.1.0/gtp_lawful_interception_cnt.htm, Dec. 2, 2008, 1 page.

3GPP Organizational Partners, "3rd Generation Partnership Project; Technical Specification Group Core and Terminals; Numbering, addressing and identification (Release 15)", 3GPP TS 23.003 V15.6.0, Dec. 2018, 130 pages.

3GPP Organizational Partners, "3rd Generation Partnership Project; Technical Specification Group Radio Access Network; UTRAN lu interface Radio Access Network Application Part (RANAP) signalling (Release 15)", 3GPP TS 25.413 V15.0.0, Jun. 2018, 455 pages.

3GPP Organizational Partners, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 15)", 3GPP TS 29.274 V15.7.1, Mar. 2019, 395 pages.

GSM Association, "LTE and EPC Roaming Guidelines", Version 14.0, Feb. 10, 2016, 82 pages.

Interactive Digital Media GMBH, "Mobile Country Codes (MCC) and Mobile Network Codes (MNC)", https://www.mcc-mnc.com/, downloaded May 6, 2019, 40 pages.

Wikipedia, "List of mobile codes by country", https://en.wikipedia.org/wiki/List_of_mobile_codes_by_country, May 5, 2019, 168 pages.

Wikipedia, "International mobile subscriber identity", https://en.wikipedia.org/wiki/International_mobile_subscriber_identity, Mar. 22, 2019, 4 pages.

Wikipedia, "Mobile identification number", https://en.wikipedia.org/wiki/Mobile_identification_number, May 27, 2017, 1 page.

Black Swan Telecom Journal, "Roaming Fraud: The Importance of Real-Time Data Exchange and Analysis", http://bswan.org/roaming_fraud.asp, Sep. 2011, 3 pages.

WEDO Technologies, "Roaming Fraud", downloaded May 6, 2019, 2 pages.

Gabriel Maciá-Fernández et al., "Fraud in roaming scenarios: An overview", IEEE Wireless Communications, Dec. 2009, 8 pages.

3GPP Organizational Partners, "3rd Generation Partnership Project; Technical Specification Group Core Network and Terminals; General Packet Radio Service (GPRS); GPRS Tunnelling Protocol (GTP) across the Gn and Gp interface (Release 15)", 3GPP TS 29.060 V15.5.0, Jun. 2019, 194 pages.

International Search Report and Written Opinion in counterpart International Application No. PCT/US2020/036929, dated Sep. 16, 2020, 14 pages.

* cited by examiner

| [MCC, MNC] | IMSI 1 | IMSI 2 | ... | IMSI N |
|---|---|---|---|---|
| TIMESTAMP | [MCC 1, MNC 1] | [MCC 2, MNC 2] | ... | [MCC N, MNC N] |
| ... | TIMESTAMP 1 | TIMESTAMP 2 | ... | TIMESTAMP N |
| | ... | ... | ... | ... |

FIG.2

| | 310(1) [MCC 1, MNC 1] | 310(2) [MCC 1, MNC 2] | 310(3) [MCC 1, MNC 3] | 310(4) [MCC 2, MNC 1] | 310(5) [MCC 2, MNC 2] | 310(6) [MCC 3, MNC 1] | ... |
|---|---|---|---|---|---|---|---|
| 320(1) [MCC 1, MNC 1] | | [MIN TIME] | [MIN TIME] | [MIN TIME] | [MIN TIME] | [MIN TIME] | ... |
| 320(2) [MCC 1, MNC 2] | [MIN TIME] | | [MIN TIME] | [MIN TIME] | [MIN TIME] | [MIN TIME] | ... |
| 320(3) [MCC 1, MNC 3] | [MIN TIME] | [MIN TIME] | | [MIN TIME] | [MIN TIME] | [MIN TIME] | ... |
| 320(4) [MCC 2, MNC 1] | [MIN TIME] | [MIN TIME] | [MIN TIME] | | [MIN TIME] | [MIN TIME] | ... |
| 320(5) [MCC 2, MNC 2] | [MIN TIME] | [MIN TIME] | [MIN TIME] | [MIN TIME] | | [MIN TIME] | ... |
| 320(6) [MCC 3, MNC 1] | ... | ... | ... | ... | ... | ... | ... |

| OCTETS | BITS | | | | | | | |
|---|---|---|---|---|---|---|---|---|
| | 8 | 7 | 6 | 5 | 4 | 3 | 2 | 1 |
| 1 | TYPE = 3 (DECIMAL) | | | | | | | |
| 2 | MCC DIGIT 2 | | | | MCC DIGIT 1 | | | |
| 3 | MNC DIGIT 3 | | | | MNC DIGIT 1 | | | |
| 4 | MNC DIGIT 2 | | | | MNC DIGIT 1 | | | |
| 5-6 | LAC | | | | | | | |
| 7 | RAC | | | | | | | |

| OCTETS | BITS 8 | 7 | 6 | 5 | 4 | 3 | 2 | 1 |
|---|---|---|---|---|---|---|---|---|
| 5 | | | MCC DIGIT 2 | | | MCC DIGIT 1 | | |
| 6 | | | MNC DIGIT 3 | | | MCC DIGIT 3 | | |
| 7 | | | MNC DIGIT 2 | | | MNC DIGIT 1 | | |
| 8-9 | LAC | | | | | | | |
| 10-11 | CI | | | | | | | |

FIG. 6B — 600B

| OCTETS | BITS 8 | 7 | 6 | 5 | 4 | 3 | 2 | 1 |
|---|---|---|---|---|---|---|---|---|
| 5 | | | MCC DIGIT 2 | | | MCC DIGIT 1 | | |
| 6 | | | MNC DIGIT 3 | | | MCC DIGIT 3 | | |
| 7 | | | MNC DIGIT 2 | | | MNC DIGIT 1 | | |
| 8-9 | LAC | | | | | | | |
| 10-11 | SAC | | | | | | | |

FIG. 6C — 600C

| OCTETS | BITS 8 | 7 | 6 | 5 | 4 | 3 | 2 | 1 |
|---|---|---|---|---|---|---|---|---|
| 5 | | | MCC DIGIT 2 | | | MCC DIGIT 1 | | |
| 6 | | | MNC DIGIT 3 | | | MCC DIGIT 3 | | |
| 7 | | | MNC DIGIT 2 | | | MNC DIGIT 1 | | |
| 8-9 | LAC | | | | | | | |
| 10-11 | RAC | | | | | | | |

700

| OCTETS | BITS | | | | | | | |
|---|---|---|---|---|---|---|---|---|
| | 8 | 7 | 6 | 5 | 4 | 3 | 2 | 1 |
| 1 | TYPE = 83 (DECIMAL) | | | | | | | |
| 2 TO 3 | LENGTH = n | | | | | | | |
| 4 | SPARE | | | | INSTANCE | | | |
| 5 | MCC DIGIT 2 | | | | MCC DIGIT 1 | | | |
| 6 | MNC DIGIT 3 | | | | MCC DIGIT 3 | | | |
| 7 | MNC DIGIT 2 | | | | MNC DIGIT 1 | | | |
| 8 TO (n+4) | THESE OCTETS IS/ARE PRESENT ONLY IF EXPLICITLY SPECIFIED | | | | | | | |

FIG.7

| OCTETS | BITS 8 | 7 | 6 | 5 | 4 | 3 | 2 | 1 |
|---|---|---|---|---|---|---|---|---|
| 1 | TYPE = 86 (DECIMAL) ||||||||
| 2 TO 3 | LENGTH = n ||||||||
| 4 | SPARE | | | INSTANCE |||||
| 5 | EXTENDED MACRO eNODEB ID | MACRO eNODEB ID | LAI | ECGI | TAI | RAI | SAI | CGI |
| a to a+6 | CGI ||||||||
| b to b+6 | SAI ||||||||
| c to c+6 | RAI ||||||||
| d to d+4 | TAI ||||||||
| e to e+6 | ECGI ||||||||
| f to f+4 | LAI ||||||||
| g to g+5 | MACRO eNODEB ID ||||||||
| g to g+5 | EXTENDED MACRO eNODEB ID ||||||||
| h to (n+4) | THESE OCTET(s) IS/ARE PRESENT ONLY IF EXPLICITLY SPECIFIED ||||||||

1310 — OBTAIN A FIRST NETWORK PACKET THAT INDICATES A FIRST MOBILE COUNTRY CODE OF A MOBILE SUBSCRIBER AT A FIRST TIME AND A FIRST MOBILE NETWORK CODE OF THE MOBILE SUBSCRIBER AT THE FIRST TIME

1320 — OBTAIN A SECOND NETWORK PACKET THAT INDICATES A SECOND MOBILE COUNTRY CODE OF THE MOBILE SUBSCRIBER AT A SECOND TIME AND A SECOND MOBILE NETWORK CODE OF THE MOBILE SUBSCRIBER AT THE SECOND TIME

1330 — DETERMINE WHETHER THE FIRST MOBILE COUNTRY CODE IS DIFFERENT FROM THE SECOND MOBILE COUNTRY CODE OR THE FIRST MOBILE NETWORK CODE IS DIFFERENT FROM THE SECOND MOBILE NETWORK CODE

1340 — IF IT IS DETERMINED THAT THE FIRST MOBILE COUNTRY CODE IS DIFFERENT FROM THE SECOND MOBILE COUNTRY CODE OR THE FIRST MOBILE NETWORK CODE IS DIFFERENT FROM THE SECOND MOBILE NETWORK CODE, DETERMINE WHETHER A DIFFERENCE BETWEEN THE SECOND TIME AND THE FIRST TIME IS LESS THAN A THRESHOLD DIFFERENCE

1350 — IF IT IS DETERMINED THAT THE DIFFERENCE BETWEEN THE SECOND TIME AND THE FIRST TIME IS LESS THAN THE THRESHOLD DIFFERENCE, ASSOCIATE THE SECOND NETWORK PACKET WITH A POTENTIAL SECURITY THREAT

FIG.13

LOCATION-BASED IDENTIFICATION OF POTENTIAL SECURITY THREAT

TECHNICAL FIELD

The present disclosure relates to telecommunications systems.

BACKGROUND

A Mobile Country Code (MCC) and a Mobile Network Code (MNC) together uniquely identify the serving core network of a mobile subscriber. The MCC can be a three-decimal digit number that corresponds to a country, and the MNC can be a two- or three-decimal digit number that corresponds to a mobile network within that country. An International Mobile Subscriber Identity (IMSI) uniquely identifies User Equipment (UE), such as a mobile phone.

BRIEF DESCRIPTION OF THE DRAWINGS

FIG. 2 illustrates a database that stores location and timestamp information corresponding to mobile subscribers, according to an example embodiment.

FIG. 3 illustrates a matrix that includes minimum times for a mobile subscriber to travel between locations, according to an example embodiment.

FIG. 4 illustrates a Routing Area Identity (RAI) Information Element (IE) that includes location information corresponding to a mobile subscriber, according to an example embodiment.

FIGS. 6A-6C illustrate alternative geographic location fields for the ULI IE of FIG. 5, according to an example embodiment.

FIG. 7 illustrates a Serving Network IE that includes location information corresponding to a mobile subscriber, according to an example embodiment.

FIG. 8 illustrates another ULI IE that includes location information corresponding to a mobile subscriber, according to an example embodiment.

FIG. 13 illustrates a flowchart of a method for identifying a potential security threat based on location information corresponding to a mobile subscriber, according to an example embodiment.

DESCRIPTION OF EXAMPLE EMBODIMENTS

Overview

In one example embodiment, a firewall obtains a first network packet that indicates a first mobile country code of a mobile subscriber at a first time and a first mobile network code of the mobile subscriber at the first time. The firewall obtains a second network packet that indicates a second mobile country code of the mobile subscriber at a second time and a second mobile network code of the mobile subscriber at the second time. The firewall determines whether the first mobile country code is different from the second mobile country code or the first mobile network code is different from the second mobile network code. If it is determined that the first mobile country code is different from the second mobile country code or the first mobile network code is different from the second mobile network code, the firewall determines whether a difference between the second time and the first time is less than a threshold difference. If it is determined that the difference between the second time and the first time is less than the threshold difference, the firewall associates the second network packet with a potential security threat.

Example Embodiments

Figure 1:
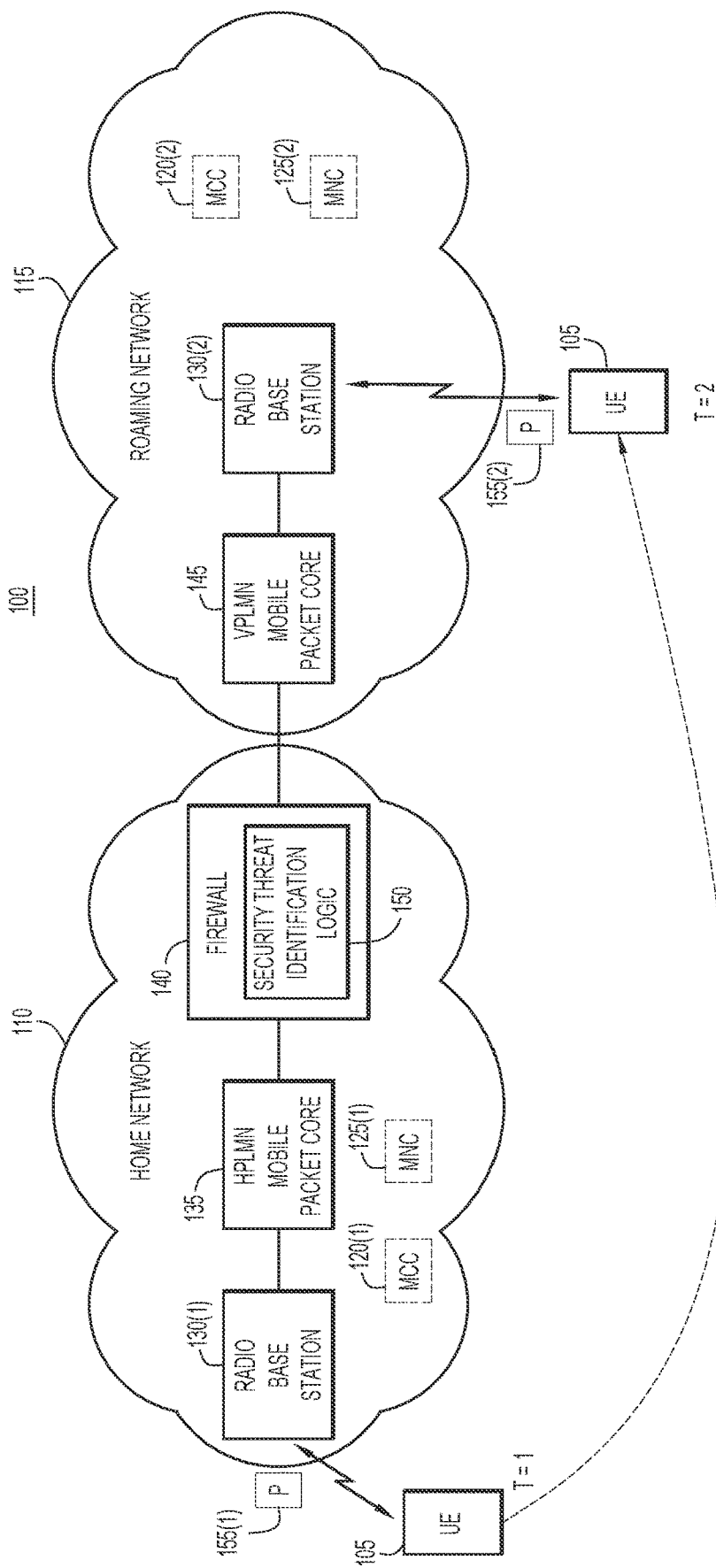
FIG. 1 illustrates a system for identifying a potential security threat based on location information corresponding to a mobile subscriber, according to an example embodiment.

FIG. 1 illustrates a system 100 for identifying a potential security threat based on location information corresponding to a mobile subscriber. System 100 includes User Equipment (UE) 105, home network 110, and roaming network 115. UE 105 may be a mobile phone with a unique International Mobile Subscriber Identity (IMSI). Home network 110 may be associated with Mobile Country Code (MCC) 120(1) and Mobile Network Code (MNC) 125(1) which together uniquely identify home network 110. Roaming network 115 may be associated with MCC 120(2) and MNC 125(2) which together uniquely identify roaming network 115.

Home network 110 includes radio base station 130(1) (e.g., eNodeB), Home Public Land Mobile Network (HPLMN) Mobile Packet Core 135, and firewall 140. Radio base station 130(1) and HPLMN Mobile Packet Core 135 may be configured to provide one or more services to UE 105 (e.g., Internet connectivity). Roaming network 115 includes radio base station 130(2) (e.g., eNodeB) and Visited Public Land Mobile Network (VPLMN) Mobile Packet Core 145. Roaming network 115 is configured to enable UE 105 to access the service(s) provided by home network 110 when UE 105 cannot access home network 110 directly. Thus, system 100 may provide roaming capabilities for UE 105.

Typically, the mobile network operator of home network 110 would pay the mobile network operator of roaming network 115 for enabling UE 105 to access the service(s) provided by home network 110, and later charge the user of UE 105 a roaming fee. In this example, however, the user of UE 105 is a bad actor who is attempting to engage in roaming fraud whereby the user accesses the service(s) provided by home network 110 via roaming network 115 in such a way that the mobile network operator of home network 110 cannot charge the user of UE 105 for the services provided and is unable to recoup losses for the payment to the mobile network operator of roaming network 115.

In some cases, roaming fraud (e.g., IMSI hijacking) can cause UE 105 to appear to access both home network 110 and roaming network 115 in an impossibly small window of time from the point of view of the mobile network operators. The window of time is impossibly small because the time to travel from a first location to directly access home network 110, to a second location to access roaming network 115, is greater than the difference in the apparent times of access. For instance, if home network 110 is only directly accessible in the United States of America and roaming network 115 is only directly accessible in Europe, it would not be possible for UE 105 to access both home network 110 and roaming network 115 in less than an hour.

Accordingly, firewall 140 includes security threat identification logic 150, which enables firewall 140 to perform operations described herein. Briefly, security threat identification logic 150 may allow the mobile network operator of home network 110 to detect physically impossible location changes of UE 105 and identify potential roaming fraud. In one example, firewall 140 obtains network packet 155(1) from UE 105 at time T=1. Network packet 155(1) indicates MCC 120(1) and MNC 125(1). At time T=2, firewall 140 obtains network packet 155(2) from UE 105. Network packet 155(2) indicates MCC 120(2) and MNC 125(2). In one example, network packets 155(1) and 155(2) may be Packet Data Protocol (PDP) packets.

Firewall 140 may determine whether MCC 120(1) is different from MCC 120(2) and/or whether MNC 125(1) is different from MNC 125(2). In some situations, firewall 140 may determine only that MCC 120(1) is different from MCC 120(2) (and ignore, or refrain from performing, a comparison of MNC 125(1) and MNC 125(2)). In this case, firewall 140 determines both that MCC 120(1) is different from MCC 120(2), and that MNC 125(1) is different from MNC 125(2). In response, firewall 140 determines whether the difference between time T=2 and time T=1 is less than a threshold difference. The threshold difference may be, for example, a minimum time for UE 105 to physically travel from a location corresponding to MCC 120(1) and MNC 125(1) to a location corresponding to MCC 120(2) and MNC 125(2).

If firewall 140 determines that the difference between time T=2 and time T=1 is less than the threshold difference, firewall 140 may associate network packet 155(2) with a potential security threat (e.g., roaming fraud). In one example, firewall 140 may issue an event log (e.g., a syslog) indicating that network packet 155(2) is associated with the potential security threat. In another example, firewall 140 may drop, block, and/or redirect network packet 155(2) and/or any subsequent network packets that belong to the same network session as network packet 155(2). Firewall 140 may repeat this process whenever a new network packet with MCC and MNC data is received.

Firewall 140 may thereby provide user-granular visibility using logs and user manageability in the same platform. This is an improvement over typical fraud detection systems in mobile network operator environments, which are typically handled by the billing, charging, and mediation systems department and are cumbersome for the team managing the mobile packet core and roaming agreements with partners. The cost to integrate existing fraud detection systems with a multi-vendor mobile packet core is expensive to maintain, and the IoT needs even more time to implement (e.g., inter-vendor operability tests between detection systems and the packet core, etc.). Many fraud detection systems are legacy systems due to the significant resources for migration and changeover. Accordingly, firewall 140 may represent a lower-cost and more effective alternative for roaming fraud detection.

In one example, network packet 155(1) may further indicate a Cell Identification (CI) of UE 105 at time T=1, and network packet 155(2) may further indicate a CI of UE 105 at time T=2. In this example, firewall 140 may determining whether the first CI is different from the second CI and, if so, determine whether the difference between time T=2 and time T=1 is less than the threshold difference. Thus, in certain cases, a CI (and/or Location Area Code (LAC)) may also/alternatively be used to determine the location of UE 105. This may be particularly useful in cases where the MCC/MNC are the same but the CI is different and corresponds to a roaming partner. Therefore, a knob may be provided as an option for a mobile network operator to include the CI in the syslog.

An example Command Line Interface (CLI) is provided as follows. The CLI may be part of the "policy-map type inspect gtp" submode.

policy-mapy type inspect gtp <gtp_policy_name>
    parameters
        [no] location-logging [cellid]

where "cell-id" is the Cell Global Identifier (CGI) or the Extended CGI (ECGI) that will be included in the syslog if present.

Firewall 140 may issue one or more syslogs to notify the mobile network operator of the location change with the CI information. In one example, the mobile network operator may activate a "logging timestamp" in order to view the time difference between locations via syslogs. At least two syslogs may be provided in accordance with operations described herein, one for PDP context activation (when UE 105 connects to home network 110) and one for location change (when UE 105 connects to roaming network 115). An example of the first syslog is provided for when PDP context activation for UE 105 is successfully complete and there is no existing PDP context (or when there is an existing PDP context but the location information is the same):

% ASA-3-: Subscriber <IMSI> PDP Context activated on network MCC <mcc> MNC <mnc>.

% ASA-3-: Subscriber <IMSI> PDP Context activated on network MCC <mcc> MNC <mnc> <mnc> CellID <cellID>

An example of the second syslog is provided for when PDP context activation or a handoff occurs and the location has changed:

% ASA-3-: Subscriber <IMSI> location changed during <procedure> from MCC <mcc> MNC <mnc> to MCC <mcc> MNC <mnc>

% ASA-3-: Subscriber <IMSI> location changed during <procedure> from MCC <mcc> MNC <mnc> CellID <cellID> to MCC <mcc> MNC <mnc> CellID <cellID>

Turning now to FIG. 2, and with continued reference to FIG. 1, shown is an example database 200 that stores location and timestamp information corresponding to IMSI 1, IMSI 2, ... IMSI N. Database 200 may be stored locally at, or remote from, firewall 140. Database 200 includes columns 210(1)-210(N) respectively corresponding to IMSI 1, IMSI 2, ... IMSI N. Database 200 also includes rows 220(1), 220(2), etc. Row 220(1) includes the most recent [MCC, MNC] tuple associated with IMSI 1, IMSI 2, ... IMSI N (e.g., MCC 1 is the most recent MCC associated with IMSI 1 and MNC 1 is the most recent MNC associated with IMSI 1, etc.). Row 220(2) includes the most recent timestamp associated with the [MCC, MNC] tuples (e.g., timestamp 1 is the time at which the network packet carrying MCC 1 and MNC 1 was obtained, timestamp 2 is the time at which the network packet carrying MCC 2 and MNC 2 was obtained, etc.).

With reference to system 100, IMSI 1 may correspond to UE 105, MCC 1 may correspond to MCC 120(1), MNC 1 may correspond to MNC 125(1), and timestamp 1 may correspond to T=1. Firewall 140 may store MCC 120(1) and MNC 125(1) in database 200. Before determining whether MCC 120(1) is different from MCC 120(2) or MNC 125(1) is different from MNC 125(2), firewall 140 may retrieve MCC 120(1), MNC 125(1), and timestamp 1 from database 200. Firewall 140 may compare MCC 120(1), MNC 125(1), and timestamp 1 with MCC 120(2), MNC 125(2), and the time at which network packet 155(2) was obtained in order to determine whether network packet 155(2) is a security threat (e.g., roaming fraud). In one example, firewall 140 may also store MCC 120(2) and MNC 125(2) in database 200 at the time of handoff between home network 110 and roaming network 115. A mobile network operator may have the option to activate timestamp logging and look up the relevant timestamps to extrapolate the information for further analysis.

At the time of PDP context creation, the MCC 120(1) and MNC 125(1) may be stored in database 200 and/or the PDP context. Database 200 may have certain advantages over the PDP context, such as helping to maintain a history of the location of UE 105 even after the PDP context is expired. In one example, database 200 may store only the most recent MCC and MNC for UE 105. Alternatively, database 200 may store all MCCs and MNCs for UE 105. In yet another example, database 200 may store some but not all MCCs and MNCs for UE 105 (e.g., a given number of the most recent MCCs and MNCs obtained for UE 105, the most recent MCCs and MNCs for UE 105 obtained within a given time period, etc.).

Turning now to FIG. 3, and with continued reference to FIG. 1, shown is an example matrix 300 that includes minimum times for a mobile subscriber to travel between locations. Matrix 300 includes at least columns 310(1)-310(6) and rows 320(1)-320(6). Each column 310(1)-310(6) and row 320(1)-320(6) corresponds to a [MCC, MNC] tuple. For example, column 310(1) corresponds to [MCC 1, MNC 1], column 310(2) corresponds to [MCC 1, MNC 2], etc. Similarly, row 320(1) corresponds to [MCC 1, MNC 1], row 320(2) corresponds to [MCC 1, MNC 2], etc. Matrix 300 also includes minimum times for a mobile subscriber to travel between locations corresponding to [MCC, MNC] tuples. For example, matrix 300 includes the minimum time for a mobile subscriber to travel from the location corresponding to [MCC 1, MNC 1] to the location corresponding to [MCC 2, MNC 2].

With reference to system 100, MCC 1 may correspond to MCC 120(1), MNC 1 may correspond to MNC 125(1), MCC 2 may correspond to MCC 120(2), and MNC 2 may correspond to MNC 125(2). When firewall 140 obtains network packet 155(2), firewall 140 may determine whether the difference between T=2 and T=1 is less than the corresponding minimum time provided in matrix 300 (here, the minimum time indicated for [MCC 1, MNC 1] and [MCC 2, MNC 2]. Matrix 300 may be preconfigured (e.g., by a manufacturer) and/or adjustable by a mobile network operator. Although in this example matrix 300 uses [MCC, MNC] tuples, it will be appreciated that in other examples matrix 300 may use only MCC data to detect fraud (e.g., the entire MCC, the first digit of the MCC to represent a geographic region, etc.).

An example CLI configuration for matrix 300 is provided as follows:
gtp-mcc-mnc <list_of_mcc_mnc>
<[mcc, mnc]>
<[mcc, mnc]>
. . . .
[no] gtp-location-change <name>
gtp-location-change fraud_alert_matrix
<[mcc, mnc]> to <list_of_mcc_mnc> min-time 2:00:00
<[mcc, mnc]> to <[mcc, mnc]> min-time 1:00:00
<[mcc, mnc]> to <[mcc, mnc]> min-time 1:30:00
<[mcc, mnc]> to <[mcc, mnc]> min-time 0:30:00
gtp-location-change loc_changes_log
<[mcc, mnc]> to <list_of_mcc_mnc> min-time 1:00:00
<[mcc, mnc]> to <[mcc, mnc]> min-time 0:30:00
Apply the above to the GTP policy-map
[no] location-tracking [not]<gtp_location_change_map> <drop|log>
policy-map type inspect gtp mygtp
parameters
location-logging cellid. ##log at creation and handoff time.
location-tracking loc_changes_log log. ##log based on matrix above
location-tracking fraud_alert_matrix drop ##drop based on matrix above
. . . .

Network packets 155(1) and 155(2) may be create PDP context requests for PDP context activation and/or update context PDP requests for PDP context handoff. For example, network packet 155(1) may be a create PDP context request, and network packet 155(2) may be an update context PDP request. Alternatively, network packets 155(1) and 155(2) may both be create PDP context requests. PDP packets may include Information Elements (IEs) comprising location information such as MCC and MNC. Thus, firewall 140 may extract/retrieve MCC 120(1) and MNC 125(1) from an IE of network packet 155(1), and MCC 120(2) and MNC 125(2) from an IE of network packet 155(2).

Firewall 140 may obtain network packets 155(1) and/or 155(2) via General Packet Radio Service (GPRS) Tunneling Protocol (GTP). Firewall 140 may support GTP version 0 (GTPv0), GTPv1, GTPv2, etc., which may implement IEs which vary depending on the particular GTP version that is implemented. GTPv1, for example, may implement Routing Area Identity (RAI) or User Location Information (ULI) IEs, which identify the serving core network of the mobile subscriber. If both the RAI IE and the ULI IE are received, location information from both IEs may be stored and compared to later [MCC, MNC] tuples. For example, if the RAI IE carries a first [MCC, MNC] tuple, and the ULI IE carries a second [MCC, MNC] tuple, an alert may be generated when an IE carrying a third [MCC, MNC] tuple is received, or when an IE carrying only one of the first and second [MCC, MNC] tuples is received (and an IE carrying the other [MCC, MNC] tuple is not).

FIG. 4 illustrates an example RAI IE 400 that includes location information corresponding to UE 105 in GTPv1. RAI IE 400 includes bits designated for location information. Bits 1 to 8 of octet 1 are designated for the IE type (here, decimal number 3). Bits 1 to 4 of octet 2 are designated for the first decimal digit of the MCC. Bits 5 to 8 of octet 2 are designated for the second decimal digit of the MCC. Bits 1 to 4 of octet 3 are designated for the third decimal digit of the MCC. Bits 5 to 8 of octet 3 are designated for the third digit of the MNC. If the MNC only includes two digits, bits 5 to 8 of octet 3 may be coded as "1111." Bits 1 to 4 of octet 4 are designated for the first decimal digit of the MNC. Bits 5 to 8 of octet 4 are designated for the second decimal digit of the MNC. Bits 1 to 8 of octets 5 and 6 are designated for the LAC. Bits 1 to 8 of octet 7 are designated for the Routing Area Code (RAC). Firewall 140 may utilize a RAI IE parser to extract the location information (e.g., MCC and MNC) from RAI IE 400 in order to perform operations described herein.

Figure 5:
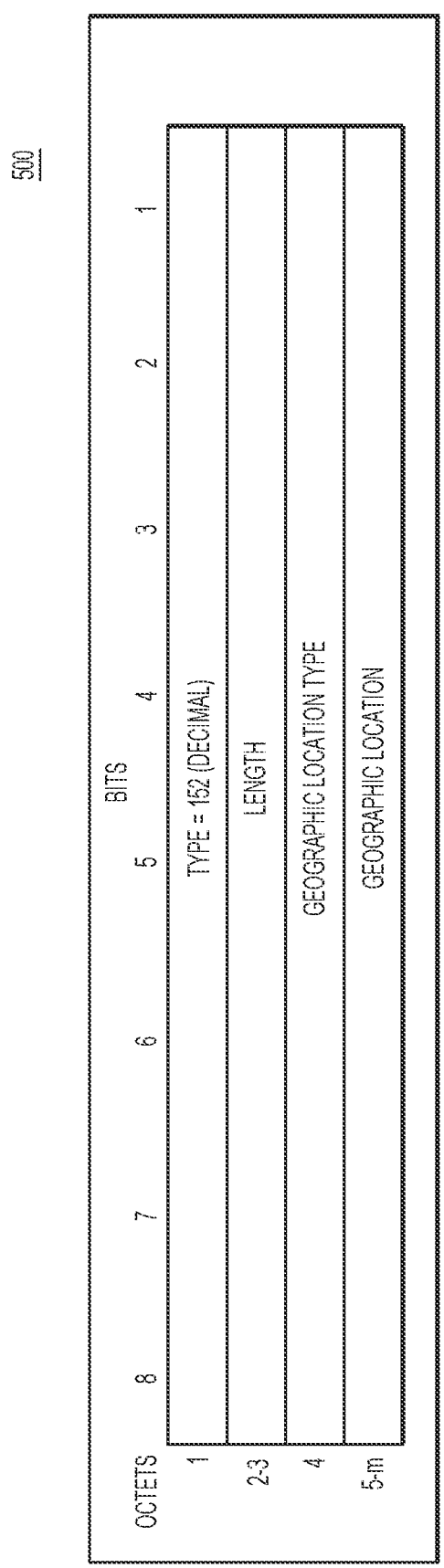
FIG. 5 illustrates a User Location Information (ULI) IE that includes location information corresponding to a mobile subscriber, according to an example embodiment.

FIG. 5 illustrates an example ULI IE 500 that includes location information corresponding to UE 105 in GTPv1. Bits 1 to 8 of octet 1 are designated for the IE type (here, decimal number 152). Bits 1 to 8 of octets 2 and 3 are designated for the length of ULI IE 500. Bits 1 to 8 of octet 4 are designated for the geographic location type, and bits 1 to 8 of octets 5 to m are designated for the geographic location. The geographic location type indicates the type of location information that is present in the geographic location field. If the decimal value of the geographic location type is 0, the geographic location field includes a CGI of where the mobile subscriber is currently registered. If the decimal value of the geographic location type is 1, the geographic location field includes a Service Area Identity (SAI) of where the mobile subscriber is currently registered. If the decimal value of the geographic location type is 2, the geographic location field includes a RAI of where the mobile subscriber is currently registered.

FIGS. 6A-6C illustrate example alternative geographic location fields 600A-600C for ULI IE 500. Geographic location field 600A illustrates the geographic location field for CGI; geographic location field 600B illustrates the geographic location field for SAI; and geographic location field 600C illustrates the geographic location field for RAI. Bits 1 to 4 of octet 5 of geographic location fields 600A-600C are designated for the first decimal digit of the MCC. Bits 5 to 8 of octet 5 are designated for the second decimal digit of the MCC. Bits 1 to 4 of octet 6 are designated for the third decimal digit of the MCC. Bits 5 to 8 of octet 6 are designated for the third decimal digit of the MNC. Bits 1 to 4 of octet 7 are designated for the first decimal digit of the MNC. Bits 5 to 8 of octet 7 are designated for the second decimal digit of the MNC. Bits 1 to 8 of octets 8 and 9 are designated for the LAC.

In geographic location field 600A, bits 1 to 8 of octets 10 and 11 are designated for the CI. In geographic location field 600B, bits 1 to 8 of octets 10 and 11 are designated for the Service Area Code (SAC). In geographic location field 600C, bits 1 to 8 of octets 10 and 11 are designated for the Routing Area Code (RAC). Firewall 140 may utilize a ULI IE parser to extract the location information (e.g., MCC/MNC and other geographic location information) from ULI IE 500 in order to perform operations described herein.

FIG. 7 illustrates an example Serving Network (SN) IE 700 that includes location information corresponding to UE 105 in GTPv2. SN IE 700 may identify the serving core network operator identifier (e.g., provided by the Mobility Management Entity (MME) MME, Serving GPRS Support Node (SGSN) configured to the S4 interface (S4-SGSN) or enhanced Packet Data Gateway (ePDG)), or the PLMN identity of the selected PLMN. Bits 1 to 8 of octet 1 are designated for the IE type (here, decimal number 83). Bits 1 to 8 of octets 2 and 3 are designated for the length of SN IE 700. Bits 1 to 4 of octet 4 is designated for the instance value. Bits 5 to 8 of octet 4 are designated as spare bits. Bits 1 to 4 of octet 5 are designated for the first decimal digit of the MCC. Bits 5 to 8 of octet 5 are designated for the second decimal digit of the MCC. Bits 1 to 4 of octet 6 are designated for the third decimal digit of the MCC. Bits 5 to 8 of octet 6 are designated for the third decimal digit of the MNC. If the MNC only includes two digits, bits 5 to 8 of octet 6 may be coded as "1111." Bits 1 to 4 of octet 7 are designated for the first decimal digit of the MNC. Bits 5 to 8 of octet 7 are designated for the second decimal digit of the MNC. Bits 1 to 8 of octets 8 to n+4 (where n is the length) are present only if explicitly specified.

SN IE 700 may be present in a create session request and/or an update bearer request for handoffs. Firewall 140 may extract the MCC and MNC from SN IE 700. If SN IE 700 prompts the PDP context to be created for the first time, firewall 140 may store the MCC and MNC and issue a syslog with the location information. If the PDP context already exists, firewall 140 may perform a location change check and issue a syslog if the location has changed, and may also update the location.

FIG. 8 illustrates an example ULI IE 800 that includes location information corresponding to UE 105 in GTPv2. Bits 1 to 8 of octet 1 are designated for the IE type (here, decimal number 86). Bits 1 to 8 of octets 2 and 3 are designated for the length of ULI IE 800. Bits 1 to 4 of octet 4 is designated for the instance value. Bits 5 to 8 of octet 4 are designated as spare bits. Bit 1 of octet 5 is designated for a CGI flag. Bit 2 of octet 5 is designated for a SAI flag. Bit 3 of octet 5 is designated for a RAI flag. Bit 4 of octet 5 is designated for a Tracking Area Identifier (TAI) flag. Bit 5 of octet 5 is designated for an ECGI flag. Bit 6 of octet 5 is designated for a Location Area Identification (LAI) flag. Bit 7 of octet 5 is designated for a Macro eNodeB ID flag. Bit 8 of octet 5 is designated for an Extended Macro eNodeB ID flag.

Bits 1 to 8 in octets a to a +6 are designated for the CGI. Bits 1 to 8 in octets b to b+6 are designated for the SAI. Bits 1 to 8 in octets c to c+6 are designated for the RAI. Bits 1 to 8 in octets d to d+4 are designated for the TAI. Bits 1 to 8 in octets e to e+6 are designated for the ECGI. Bits 1 to 8 in octets f to f+4 are designated for the LAI. Bits 1 to 8 in octets g to g+5 are designated for the Macro eNodeB ID or the Extended Macro eNodeB ID. Bits 1 to 8 in octets h to n+4 (where n is the length of ULI IE 800) are present only if explicitly specified.

The flags in octet 5 indicate whether the corresponding type is present in a respective field. If a flag is set to 0, the corresponding field is not present. For example, if the CGI flag is set to 0, bits 1 to 8 in octets a to a +6 designated for the CGI are not present. Conversely, if the CGI flag is set to 1, bits 1 to 8 in octets a to a +6 designated for the CGI are present. ULI IE 800 may contain only one identity of the same type (e.g., more than one CGI cannot be included), but ULI IE 800 may contain more than one identity of a different type (e.g., may contain both ECGI and TAI). If more than one identity of a different type is present, ULI IE 800 may include those identities in the following order: CGI, SAI, RAI, TAI, ECGI, LAI, Macro eNodeB ID/Extended Macro eNodeB ID. Only one of the Macro eNodeB ID or Extended Macro eNodeB ID may be present in ULI IE 800.

Furthermore, only one of the CGI and ECGI may be present in ULI IE 800. For initial attach/PDP context activation, the ECGI and TAI may be provided via the S11 interface. This may be forwarded from a MME to a Serving Gateway (SGW) and then to a Packet Data Network (PDN) Gateway (PGW) via the S5/S8 interface(s). The CGI/SAI together with RAI may be provided via the S4 interface. For handoffs, the MME may include the ECGI and/or TAI. The S4-SGSN may provide the CGI, SAI, or RAI, or the CGI/SAI together with the RAI. The SGW may forward this information via the S5/S8 interface if received from the MME/SGSN.

Figure 9:
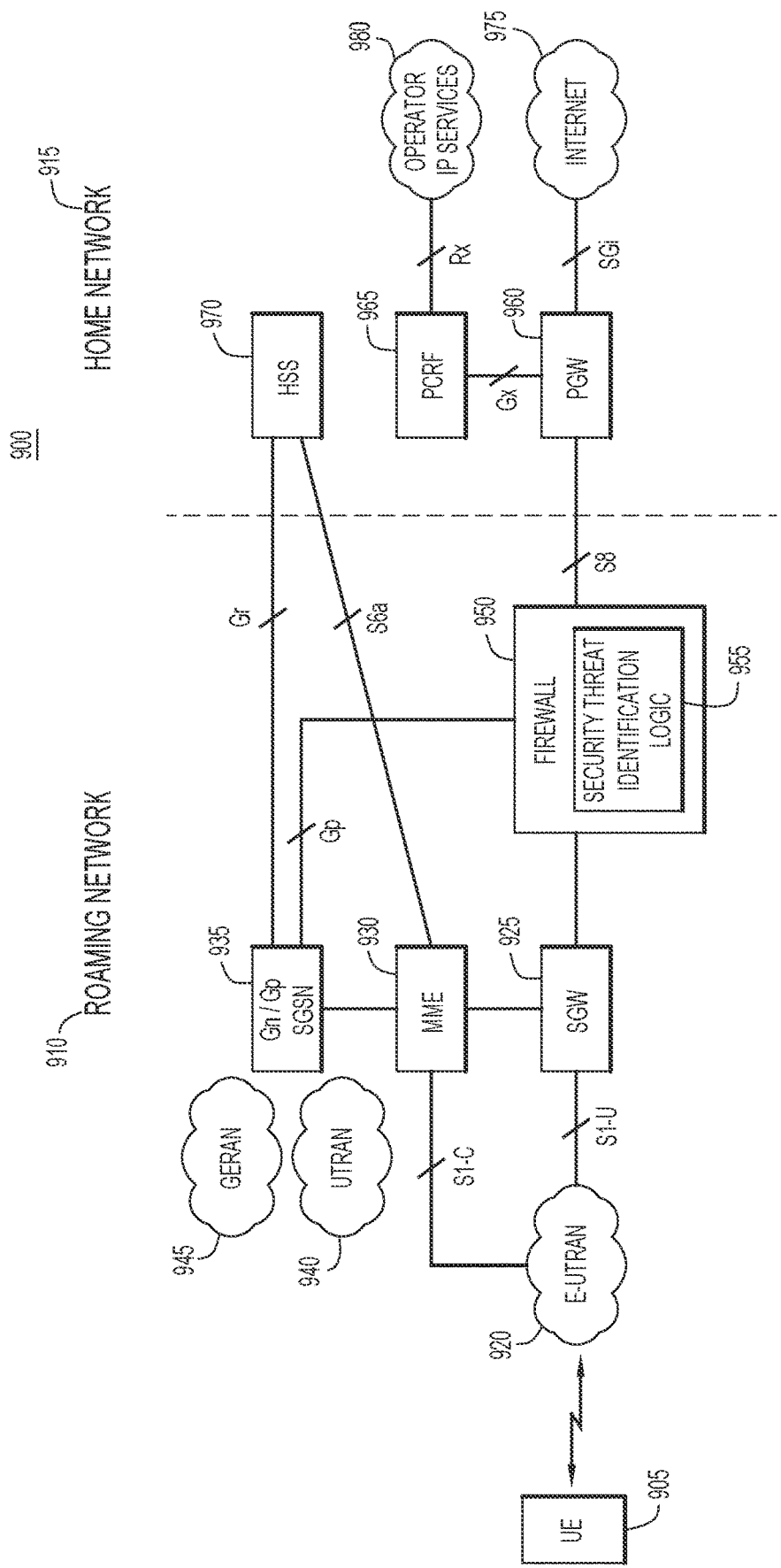
FIG. 9 illustrates a 4G system for identifying a potential security threat based on location information corresponding to a mobile subscriber, according to an example embodiment.

FIG. 9 illustrates an example 4G system 900 for identifying a potential security threat based on location information corresponding to a mobile subscriber. System 900 includes UE 905, roaming network 910, and home network 915. Roaming network 910 includes Evolved Universal Mobile Telecommunications System (UMTS) Terrestrial Radio Access Network (E-UTRAN) 920, SGW 925, MME 930, SGSN 935, UTRAN 940, and Global System for Mobile communications (GSM) Enhanced Data Rates for GSM Evolution (EDGE) Radio Access Network (GERAN) 945. Roaming network 910 further includes firewall 950, which in turn includes security threat identification logic 955. Home network 915 includes PGW 960, Policy and Charging Rules Function (PCRF) 965, Home Subscriber Server (HSS) 970, Internet 975, and Operator IP Services 980 (e.g., IP Multimedia Subsystem, etc.).

E-UTRAN 920 may comprise an eNodeB that connects UE 905 to SGW 925 and MME 930. SGW 925 may route and forward user data packets, and MME 930 may control various aspects of user access. SGSN 935 may track of the location of UE 905 and perform security functions and access control in conjunction with UTRAN 940 and GERAN 945. Security threat identification logic 955 may cause firewall 950 to perform operations described herein. PGW 960 may provide connectivity from UE 905 to Internet 975. PCRF 965 makes policy control decisions with assistance from Operator IP Services 980. HSS 970 is a central database that contains user-related and subscription-related information associated with UE 905. While FIG. 9 illustrates a 4G system, it will be appreciated that the techniques described herein may be similarly implemented on a telecommunications system of any generation (e.g., 2G, 3G, 4G, 5G, etc.).

Figure 10:
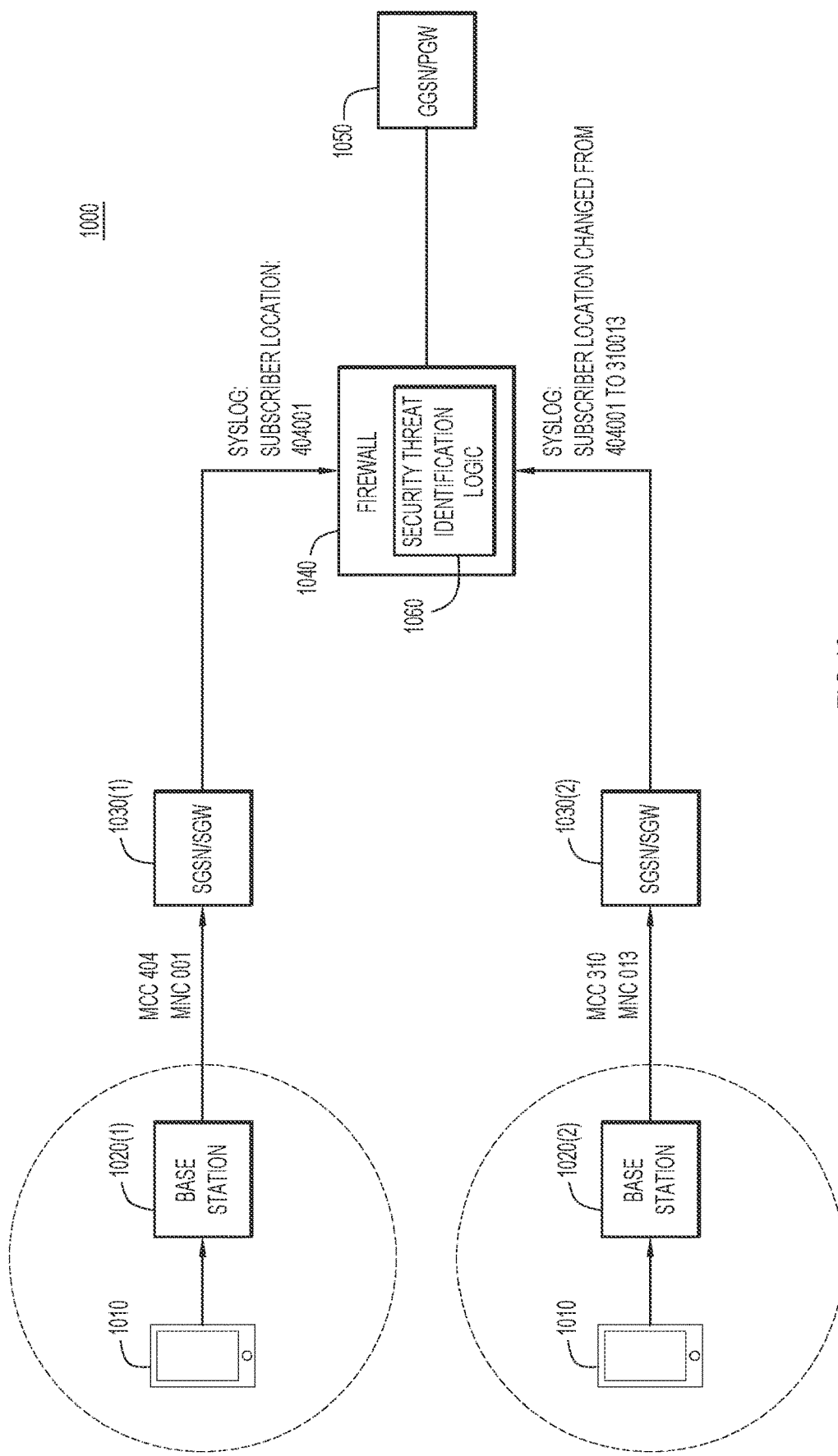
FIG. 10 illustrates a system for identifying a security threat based on location information corresponding to a mobile subscriber using a RAI IE, according to an example embodiment.

FIG. 10 illustrates an example system 1000 for identifying a security threat based on location information corresponding to a mobile subscriber using a RAI IE. System 1000 includes UE 1010, base stations 1020(1) and 1020(2), SGSNs/SGWs 1030(1) and 1030(2), firewall 1040, and Gateway GPRS Support Node (GGSN)/PGW 1050. Firewall 1040 includes security threat identification logic 1060. Base station 1020(1) and SGSN/SGW 1030(1) may be part of a home network, and base station 1020(2) and SGSN/SGW 1030(2) may be part of a roaming network. GGSN/PGW 1050 may help route user data packets between UE 1010 and one or more external networks.

In this example, at a first time, UE 1010 sends a PDP context create request including a RAI IE to SGSN/SGW 1030(1) via base station 1020(1). The RAI IE includes a MCC of 404 and a MNC of 001. SGSN/SGW 1030(1) provides the MCC and MNC to firewall 1040, which stores the MCC and the MNC and issues a syslog indicating that the subscriber location is "404001" (i.e., a concatenation of the MCC and the MNC). At a second time, UE 1010 sends a PDP context update request including another RAI IE to SGSN/SGW 1030(2) via base station 1020(2). UE 1010 may send the PDP context update request in accordance with a handoff procedure between base station 1020(1) and 1020(2). The RAI IE includes an MCC of 310 and an MNC of 013. SGSN/SGW 1030(2) provides the MCC and MNC to firewall 1040, which determines that the new MCC and MNC are different from the previously stored MCC and MNC. If firewall 1040 determines that the location change occurred impossibly fast, firewall 1040 may take preventative action, such as issuing a syslog indicating that the subscriber location changed from "404001" to "310013."

The position of firewall 1040 in the service provider infrastructure in system 1000 enables early prevention of fraudulent activity before it reaches the core (e.g., MME, GGSN, PGW, etc.). Furthermore, firewall 1040 may detect location changes based on inspection of network packets (e.g., GTP messages on the S5/S8 and Gp interfaces) and output syslogs which may be used for auditing and extrapolating information regarding possible fraudulent activities, as well as alarming.

Figure 11A:
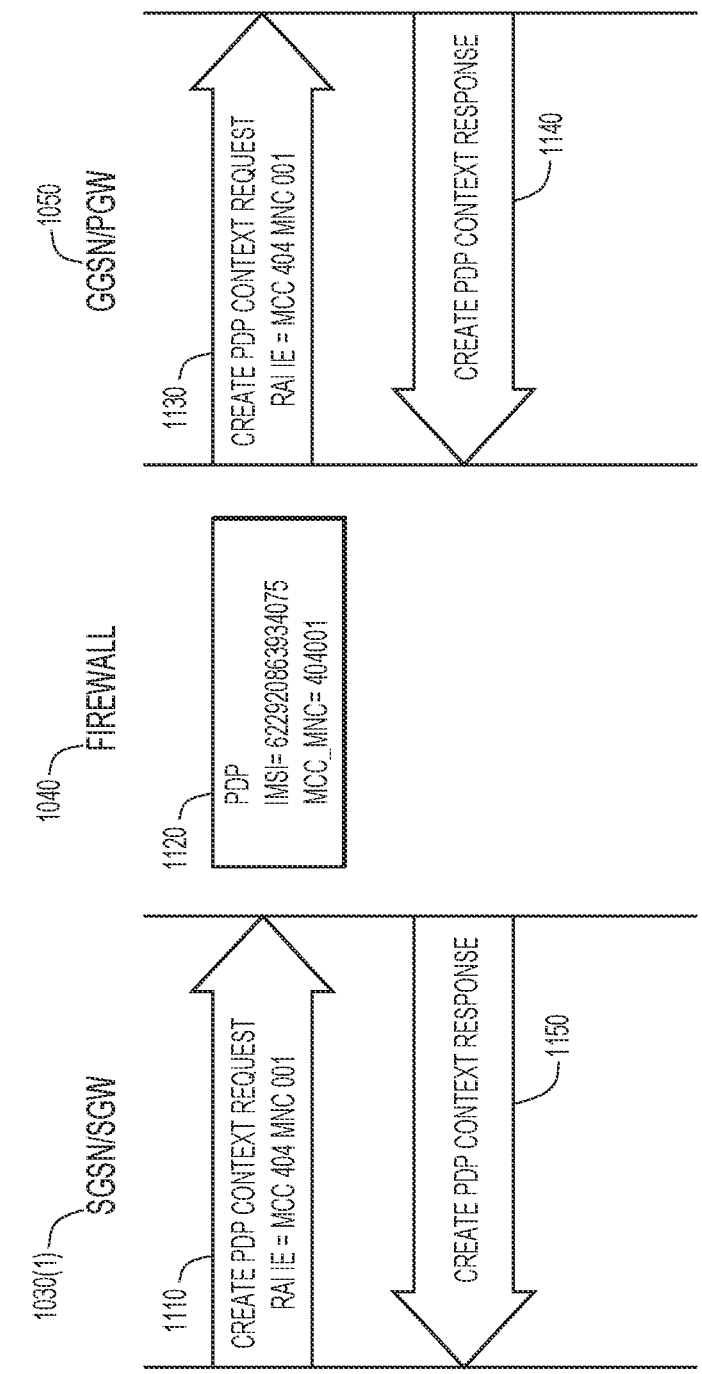
FIG. 11A illustrates a call flow diagram for Packet Data Protocol (PDP) context creation in the system of FIG. 10, according to an example embodiment.

FIG. 11A illustrates an example call flow diagram 1100A for PDP context creation in system 1000. Call flow diagram 1100A illustrates PDP context creation for GTPv1, although GTPv2 may follow a similar procedure. At 1110, SGSN/SGW 1030(1) provides the PDP context create request including the RAI IE to firewall 1040. The RAI IE includes the MCC of 404 and the MNC of 001. At 1120, firewall 1040 stores the PDP context based on the IMSI identifying UE 1010. Firewall 140 stores the concatenated MCC and MNC values as part of the PDP context. At 1130, firewall 1040 provides the PDP context create request to GGSN/PGW 1050. At 1140, GGSN/PGW 1050 provides a PDP context create response to firewall 1040. At 1150, firewall 1040 provides the PDP context create response to SGSN/SGW 1030(1).

Figure 11B:
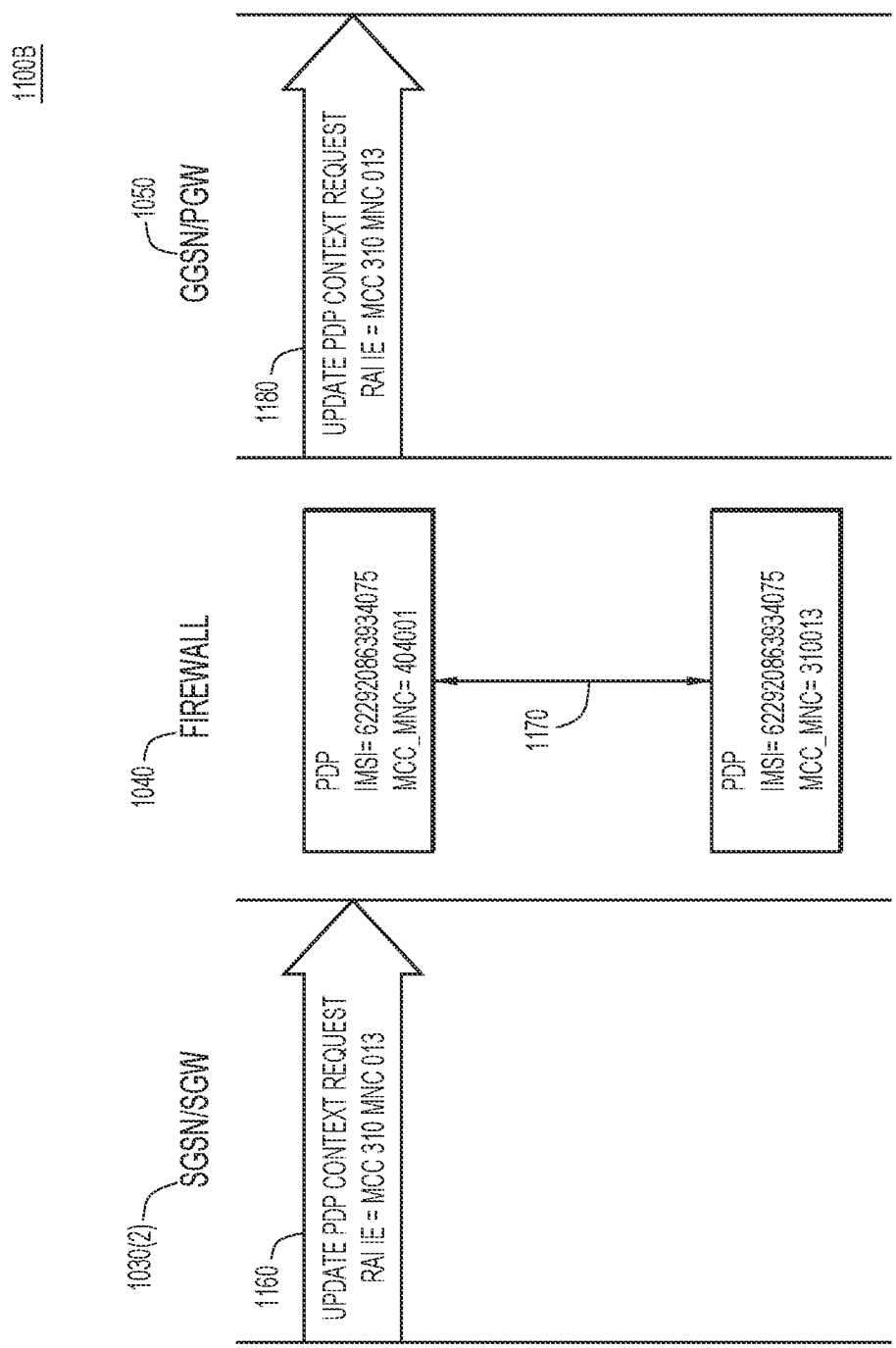
FIG. 11B illustrates a call flow diagram for PDP context updating due to User Equipment (UE) handoff in the system of FIG. 10, according to an example embodiment.

FIG. 11B illustrates an example call flow diagram for PDP context updating in system 1000. Call flow diagram 1100B illustrates PDP context creation for GTPv1, although GTPv2 may follow a similar procedure. At 1160, SGSN/SGW 1030(2) provides the PDP context update request including the RAI IE to firewall 1040. The RAI IE includes the MCC of 310 and the MNC of 013. The RAI IE also include the same IMSI as the previous RAI IE. At 1170, firewall 1040 determines that the IMSIs are identical, compares the stored MCC and MNC with the new MCC and MNC, determines that the MCCs and MNCs are different, and logs the difference (e.g., outputs a syslog). Firewall 1040 may further update the new concatenated MCC and MNC in the PDP context data structure. It will be appreciated that firewall 1040 may perform similar operations if the subsequent message is a second PDP context creation, provided the previous PDP context entry has not expired. At 1180, firewall 1040 provides the PDP context update request to GGSN/PGW 1050.

Figure 12:
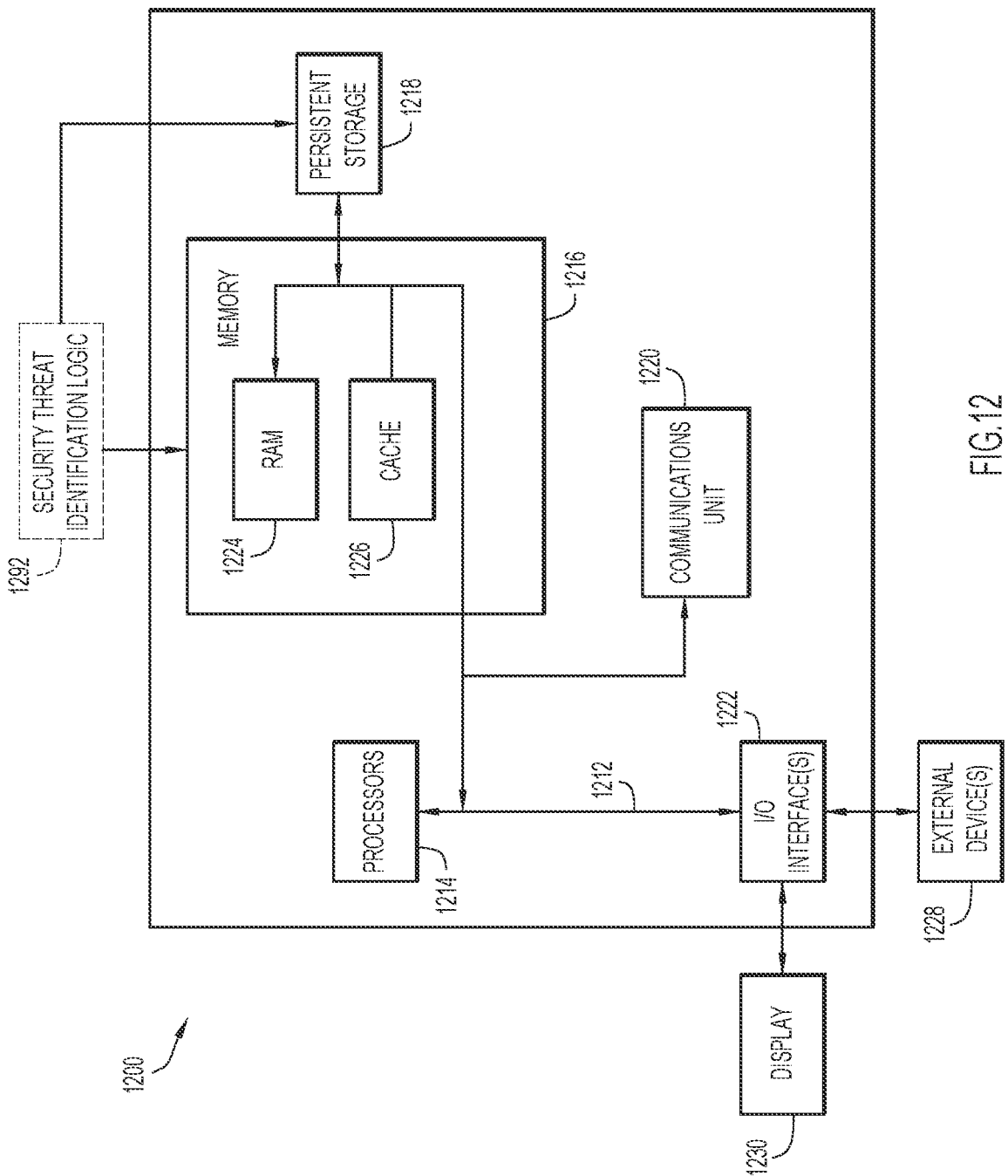
FIG. 12 illustrates a block diagram of a computing device configured to identify a potential security threat based on location information corresponding to a mobile subscriber, according to an example embodiment.

FIG. 12 illustrates a hardware block diagram of a computing device 1200 that may perform the functions of any of the servers or computing or control entities referred to herein in connection with security threat identification. It should be appreciated that FIG. 12 provides only an illustration of one embodiment and does not imply any limitations with regard to the environments in which different embodiments may be implemented. Many modifications to the depicted environment may be made.

As depicted, the device 1200 includes a bus 1212, which provides communications between computer processor(s) 1214, memory 1216, persistent storage 1218, communications unit 1220, and input/output (I/O) interface(s) 1222. Bus 1212 can be implemented with any architecture designed for passing data and/or control information between processors (such as microprocessors, communications and network processors, etc.), system memory, peripheral devices, and any other hardware components within a system. For example, bus 1212 can be implemented with one or more buses.

Memory 1216 and persistent storage 1218 are computer readable storage media. In the depicted embodiment, memory 1216 includes Random Access Memory (RAM) 1224 and cache memory 1226. In general, memory 1216 can include any suitable volatile or non-volatile computer readable storage media. Instructions for security threat identification logic 1292 may be stored in memory 1216 or persistent storage 1218 for execution by processor(s) 1214.

One or more programs may be stored in persistent storage 1218 for execution by one or more of the respective computer processors 1214 via one or more memories of memory 1216. The persistent storage 1218 may be a magnetic hard disk drive, a solid state hard drive, a semiconductor storage device, Read-Only Memory (ROM), Erasable Programmable ROM (EPROM), flash memory, or any other computer readable storage media that is capable of storing program instructions or digital information.

The media used by persistent storage 1218 may also be removable. For example, a removable hard drive may be used for persistent storage 1218. Other examples include optical and magnetic disks, thumb drives, and smart cards that are inserted into a drive for transfer onto another computer readable storage medium that is also part of persistent storage 1218.

Communications unit 1220, in these examples, provides for communications with other data processing systems or devices. In these examples, communications unit 1220 includes one or more network interface cards. Communications unit 1220 may provide communications through the use of either or both physical and wireless communications links.

I/O interface(s) 1222 allows for input and output of data with other devices that may be connected to device 1200. For example, I/O interface 1222 may provide a connection to external devices 1228 such as a keyboard, keypad, a touch screen, and/or some other suitable input device. External devices 1228 can also include portable computer readable storage media such as database systems, thumb drives, portable optical or magnetic disks, and memory cards.

Software and data used to practice embodiments can be stored on such portable computer readable storage media and can be loaded onto persistent storage 1218 via I/O interface(s) 1222. I/O interface(s) 1222 may also connect to a display 1230. Display 1230 provides a mechanism to display data to a user and may be, for example, a computer monitor.

FIG. 13 is a flowchart of a method 1300 for location-based identification of a potential security threat. Method 1300 may be performed by a firewall, for example. At 1310, the firewall obtains a first network packet that indicates a first mobile country code of a mobile subscriber at a first time and a first mobile network code of the mobile subscriber at the first time. At 1320, the firewall obtains a second network packet that indicates a second mobile country code of the mobile subscriber at a second time and a second mobile network code of the mobile subscriber at the second time. The first network packet may be obtained as part of a first network session, and the second network packet may be obtained as part of a second network session. In one example, the first and second network sessions may be consecutive.

At 1330, the firewall determines whether the first mobile country code is different from the second mobile country code or the first mobile network code is different from the second mobile network code. At 1340, if it is determined that the first mobile country code is different from the second mobile country code or the first mobile network code is different from the second mobile network code, the firewall determines whether a difference between the second time and the first time is less than a threshold difference. At 1350, if it is determined that the difference between the second time and the first time is less than the threshold difference, the firewall associates the second network packet with a potential security threat.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an Erasable Programmable Read-Only Memory (EPROM or Flash memory), a Static RAM (SRAM), a portable CD-ROM, a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: obtaining a first network packet that indicates a first mobile country code of a mobile subscriber at a first time and a first mobile network code of the mobile subscriber at the first time; obtaining a second network packet that indicates a second mobile country code of the mobile subscriber at a second time and a second mobile network code of the mobile subscriber at the second time; determining whether the first mobile country code is different from the second mobile country code or the first mobile network code is different from the second mobile network code; if it is determined that the first mobile country code is different from the second mobile country code or the first mobile network code is different from the second mobile network code, determining whether a difference between the second time and the first time is less than a threshold difference; and if it is determined that the difference between the second time and the first time is less than the threshold difference, associating the second network packet with a potential security threat.

In one example, the first network packet further indicates a first cell identifier of the mobile subscriber at the first time, and the second network packet further indicates a second cell identifier of the mobile subscriber at the second time, the method further comprising: determining whether the first cell identifier is different from the second cell identifier; and if it is determined that the first cell identifier is different from the second cell identifier, determining whether the difference between the second time and the first time is less than the threshold difference.

In one example, the method further comprises: extracting the first mobile country code and the first mobile network code from a first information element of the first network packet; and extracting the second mobile country code and the second mobile network code from a second information element of the second network packet.

In one example, the method further comprises: storing the first mobile country code and the first mobile network code in a database; and before determining whether the first mobile country code is different from the second mobile country code or the first mobile network code is different from the second mobile network code, retrieving the first mobile country code and the first mobile network code from the database.

In one example, the method further comprises: issuing an event log indicating that the second network packet is associated with the potential security threat. In another example, the second network packet belongs to a network session, the method further comprising: dropping, blocking, or redirecting the second network packet and any subsequent network packets that belong to the network session.

In one example, obtaining the first network packet includes obtaining the first network packet via a general packet radio service tunneling protocol; and obtaining the second network packet includes obtaining the second network packet via the general packet radio service tunneling protocol.

In another form, an apparatus is provided. The apparatus comprises: a network interface configured to obtain and/or provide network packets; and one or more processors coupled to the network interface, wherein the one or more processors are configured to: obtain a first network packet that indicates a first mobile country code of a mobile subscriber at a first time and a first mobile network code of the mobile subscriber at the first time; obtain a second network packet that indicates a second mobile country code of the mobile subscriber at a second time and a second mobile network code of the mobile subscriber at the second time; determine whether the first mobile country code is different from the second mobile country code or the first mobile network code is different from the second mobile network code; if it is determined that the first mobile country code is different from the second mobile country code or the first mobile network code is different from the second mobile network code, determine whether a difference between the second time and the first time is less than a threshold difference; and if it is determined that the difference between the second time and the first time is less than the threshold difference, associate the second network packet with a potential security threat.

In another form, one or more non-transitory computer readable storage media are provided. The non-transitory computer readable storage media are encoded with instructions that, when executed by a processor, cause the processor to: obtain a first network packet that indicates a first mobile country code of a mobile subscriber at a first time and a first mobile network code of the mobile subscriber at the first time; obtain a second network packet that indicates a second mobile country code of the mobile subscriber at a second time and a second mobile network code of the mobile subscriber at the second time; determine whether the first mobile country code is different from the second mobile country code or the first mobile network code is different from the second mobile network code; if it is determined that the first mobile country code is different from the second mobile country code or the first mobile network code is different from the second mobile network code, determine whether a difference between the second time and the first time is less than a threshold difference; and if it is determined that the difference between the second time and the first time is less than the threshold difference, associate the second network packet with a potential security threat.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   obtaining a first network packet that indicates a first mobile country code of a mobile subscriber at a first time and a first mobile network code of the mobile subscriber at the first time;
   obtaining a second network packet that indicates a second mobile country code of the mobile subscriber at a second time and a second mobile network code of the mobile subscriber at the second time;
   determining whether the first mobile country code is different from the second mobile country code or the first mobile network code is different from the second mobile network code;
   if it is determined that the first mobile country code is different from the second mobile country code or the first mobile network code is different from the second mobile network code, determining whether a difference between the second time and the first time is less than a threshold difference that is based on a plurality of threshold differences corresponding to respective combinations of mobile country codes and mobile network codes; and
   if it is determined that the difference between the second time and the first time is less than the threshold difference, associating the second network packet with a potential security threat.

2. The method of claim 1, wherein the first network packet further indicates a first cell identifier of the mobile subscriber at the first time, and the second network packet further indicates a second cell identifier of the mobile subscriber at the second time, the method further comprising:
   determining whether the first cell identifier is different from the second cell identifier; and
   if it is determined that the first cell identifier is different from the second cell identifier, determining whether the difference between the second time and the first time is less than the threshold difference.

3. The method of claim 1, further comprising:
   extracting the first mobile country code and the first mobile network code from a first information element of the first network packet; and
   extracting the second mobile country code and the second mobile network code from a second information element of the second network packet.

4. The method of claim 1, further comprising:
   storing the first mobile country code and the first mobile network code in a database; and
   before determining whether the first mobile country code is different from the second mobile country code or the first mobile network code is different from the second mobile network code, retrieving the first mobile country code and the first mobile network code from the database.

5. The method of claim 1, further comprising:
   issuing an event log indicating that the second network packet is associated with the potential security threat.

6. The method of claim 1, wherein the second network packet belongs to a network session, the method further comprising:
   dropping, blocking, or redirecting the second network packet and any subsequent network packets that belong to the network session.

7. The method of claim 1, wherein:
   obtaining the first network packet includes obtaining the first network packet via a general packet radio service tunneling protocol; and
   obtaining the second network packet includes obtaining the second network packet via the general packet radio service tunneling protocol.

8. An apparatus comprising:
   a network interface configured to obtain and/or provide network packets; and
   one or more processors coupled to the network interface, wherein the one or more processors are configured to:
      obtain a first network packet that indicates a first mobile country code of a mobile subscriber at a first time and a first mobile network code of the mobile subscriber at the first time;
      obtain a second network packet that indicates a second mobile country code of the mobile subscriber at a second time and a second mobile network code of the mobile subscriber at the second time;
      determine whether the first mobile country code is different from the second mobile country code or the first mobile network code is different from the second mobile network code;
      if it is determined that the first mobile country code is different from the second mobile country code or the first mobile network code is different from the second mobile network code, determine whether a difference between the second time and the first time is less than a threshold difference that is based on a plurality of threshold differences corresponding to respective combinations of mobile country codes and mobile network codes; and
      if it is determined that the difference between the second time and the first time is less than the threshold difference, associate the second network packet with a potential security threat.

9. The apparatus of claim 8, wherein the first network packet further indicates a first cell identifier of the mobile subscriber at the first time, and the second network packet further indicates a second cell identifier of the mobile subscriber at the second time, and wherein the one or more processors are further configured to:

determine whether the first cell identifier is different from the second cell identifier; and if it is determined that the first cell identifier is different from the second cell identifier, determine whether the difference between the second time and the first time is less than the threshold difference.

10. The apparatus of claim 8, wherein the one or more processors are further configured to:

extract the first mobile country code and the first mobile network code from a first information element of the first network packet; and extract the second mobile country code and the second mobile network code from a second information element of the second network packet.

11. The apparatus of claim 8, wherein the one or more processors are further configured to:

store the first mobile country code and the first mobile network code in a database; and before determining whether the first mobile country code is different from the second mobile country code or the first mobile network code is different from the second mobile network code, retrieve the first mobile country code and the first mobile network code from the database.

12. The apparatus of claim 8, wherein the one or more processors are further configured to:

issue an event log indicating that the second network packet is associated with the potential security threat.

13. The apparatus of claim 8, wherein the second network packet belongs to a network session, and wherein the one or more processors are further configured to:

drop, block, or redirect the second network packet and any subsequent network packets that belong to the network session.

14. The apparatus of claim 8, wherein the one or more processors are further configured to:

obtain the first network packet via a general packet radio service tunneling protocol; and obtain the second network packet via the general packet radio service tunneling protocol.

15. One or more non-transitory computer readable storage media encoded with instructions that, when executed by a processor, cause the processor to:

obtain a first network packet that indicates a first mobile country code of a mobile subscriber at a first time and a first mobile network code of the mobile subscriber at the first time;

obtain a second network packet that indicates a second mobile country code of the mobile subscriber at a second time and a second mobile network code of the mobile subscriber at the second time;

determine whether the first mobile country code is different from the second mobile country code or the first mobile network code is different from the second mobile network code;

if it is determined that the first mobile country code is different from the second mobile country code or the first mobile network code is different from the second mobile network code, determine whether a difference between the second time and the first time is less than a threshold difference that is based on a plurality of threshold differences corresponding to respective combinations of mobile country codes and mobile network codes; and if it is determined that the difference between the second time and the first time is less than the threshold difference, associate the second network packet with a potential security threat.

16. The one or more non-transitory computer readable storage media of claim 15, wherein the first network packet further indicates a first cell identifier of the mobile subscriber at the first time, and the second network packet further indicates a second cell identifier of the mobile subscriber at the second time, and wherein the instructions further cause the processor to:

determine whether the first cell identifier is different from the second cell identifier; and if it is determined that the first cell identifier is different from the second cell identifier, determine whether the difference between the second time and the first time is less than the threshold difference.

17. The one or more non-transitory computer readable storage media of claim 15, wherein the instructions further cause the processor to:

extract the first mobile country code and the first mobile network code from a first information element of the first network packet; and extract the second mobile country code and the second mobile network code from a second information element of the second network packet.

18. The one or more non-transitory computer readable storage media of claim 15, wherein the instructions further cause the processor to:

store the first mobile country code and the first mobile network code in a database; and before determining whether the first mobile country code is different from the second mobile country code or the first mobile network code is different from the second mobile network code, retrieve the first mobile country code and the first mobile network code from the database.

19. The one or more non-transitory computer readable storage media of claim 15, wherein the instructions further cause the processor to:

issue an event log indicating that the second network packet is associated with the potential security threat; or drop, block, or redirect the second network packet and any subsequent network packets that belong to a network session to which the second network packet belongs.

20. The one or more non-transitory computer readable storage media of claim 15, wherein the instructions further cause the processor to:

obtain the first network packet via a general packet radio service tunneling protocol; and obtain the second network packet via the general packet radio service tunneling protocol.

* * * * *